Jan. 24, 1967    M. MAUCLET    3,299,643
SINKING OF SHAFTS AND GALLERIES IN
SAND AND WATER-BEARING GROUND
Filed March 26, 1964    2 Sheets-Sheet 1
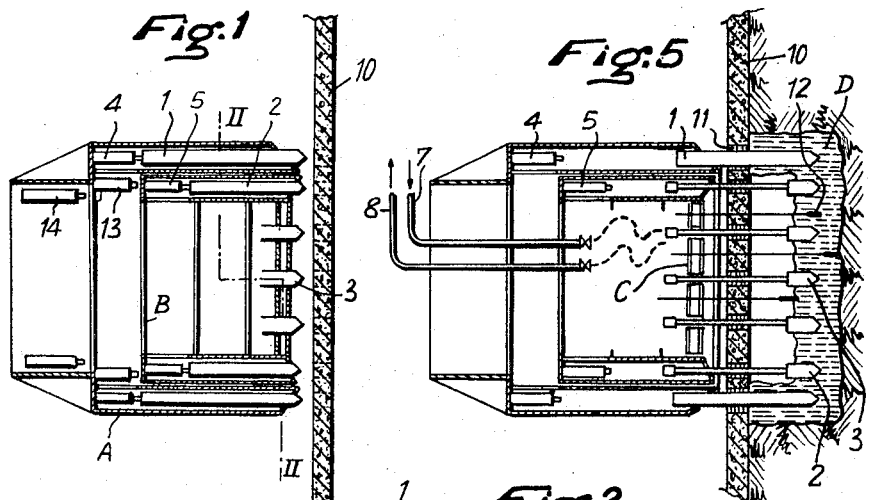
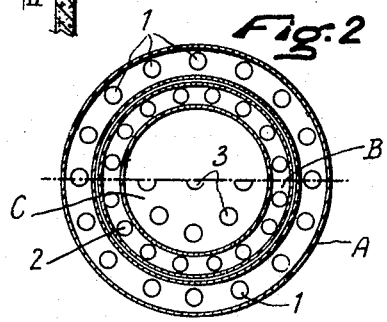
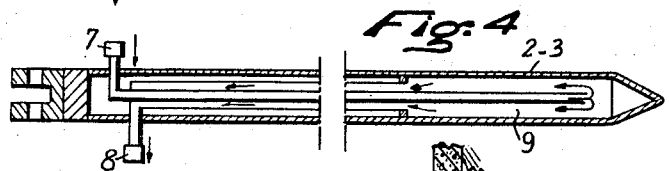
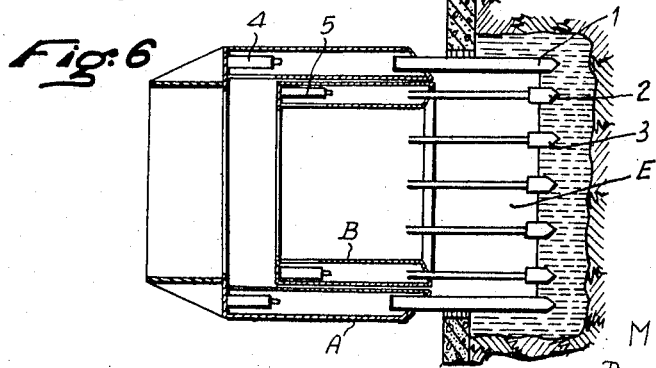
INVENTOR
MAURICE MAUCLET Jan. 24, 1967    M. MAUCLET    3,299,643
SINKING OF SHAFTS AND GALLERIES IN
SAND AND WATER-BEARING GROUND
Filed March 26, 1964    2 Sheets-Sheet 2
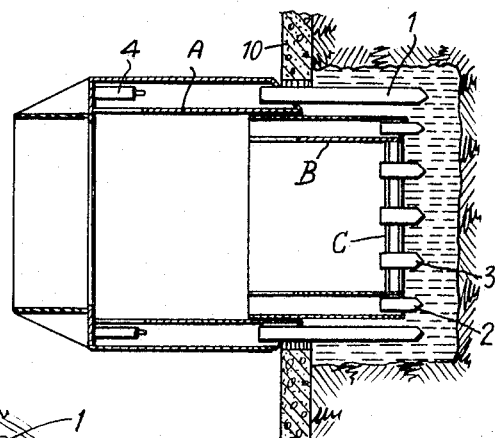
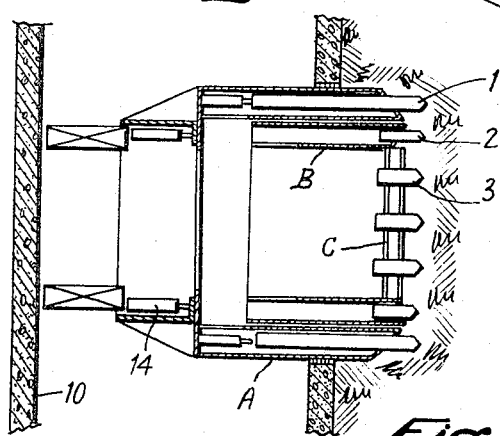
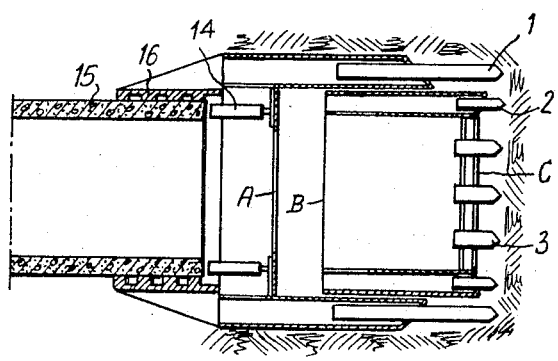
INVENTOR
MAURICE MAUCLET United States Patent Office 3,299,643
Patented Jan. 24, 1967

3,299,643
SINKING OF SHAFTS AND GALLERIES IN SAND
AND WATER-BEARING GROUND
Maurice Mauclet, 9 Rue Aristad Briand,
Meru, France
Filed Mar. 26, 1964, Ser. No. 354,875
Claims priority, application France, Apr. 5, 1963,
930,560
2 Claims. (Cl. 61—36)

This invention relates to the sinking of shafts and galleries in sand and water-bearing ground. The sinking of shafts or galleries by the conventional methods of artificial freezing of the ground requires, in all cases, the preliminary establishment of one or more frozen enclosures exteriorly of the work.

These processes necessitate the erection of very costly accessory installations (central refrigerating and more especially freezing stations), the power and size of which are proportional to the dimensions of the work in question.

Moreover civil engineering works, such as sinking or driving and laying of revetments, are subject to the partial or total freezing of the surrounding ground, which often leads to considerable bulk; furthermore these walls of ice must be maintained during the whole of the construction work.

These conditions put a considerable burden on the erection costs of the works to be constructed, whilst at the same time seriously prolonging the time required to execute them.

In addition to these disadvantages, with present-day freezing processes, the formation of the enclosures is always tricky because it is difficult to control; the formation of "windows" (non-frozen zones), the deflection or breaking of freezing devices which is always possible, risk seriously jeopardizing the fluid-tightness of the whole unit.

Furthermore, it sometimes happens that the application of this technique necessitates, with the current processes, the presence of particular geological conditions (impermeable strata for example) or the creation of supplementary screens requiring recourse to work of a different nature (injections of cement or of chemical products).

The present invention has principally as its object to avoid these disadvantages and consists of an apparatus characterised by the features that it is constituted by at least two tubular caissons, one slidably telescoped within the other, a removable shield at the forward end of the apparatus, respective freezers slidably mounted in each of the caissons and in the shield, in the case where soil stabilization is effected by freezing, or by respective injection needles mounted on the caissons and on the shield, in the case where soil stabilization is effected by chemical solidification, means for projecting either the freezers or the injection needles into the soil to be stabilized, and means are likewise provided for displacing the said caissons relatively to one another and to the ground.

The present invention likewise covers other arrangements which are described below and/or illustrated in the accompanying drawings.

In the drawings:

FIG. 1 shows an apparatus according to the present invention placed in position for driving a horizontal gallery;

FIG. 2 is a section along the line II—II of FIG. 1;

FIGS. 3 and 4 show details of this apparatus;

FIG. 5 is a view, similar to FIG. 1, illustrating the apparatus during a first stage of the soil solidification procedure;

FIG. 6 is a view, similar to FIG. 5, illustrating the apparatus during a second stage of the operation;

FIG. 7 is a view similar to FIGS. 5 and 6, illustrating the apparatus during a further stage of the operation and during which an inner caisson is advanced into an excavated portion of a solidified shell of the soil;

FIG. 8 is a view similar to FIGS. 5, 6 and 7, illustrating the apparatus at the end of a first operating cycle; and FIG. 9 is a view, similar to FIGS. 5–8, illustrating the apparatus during a further stage of driving a gallery or shaft, and further showing the construction of a revetment constituting a lining for the gallery or shaft and serving as a base for operating the apparatus.

The apparatus for sinking galleries shown in the accompanying drawings consists substantially of an outer tubular caisson A, an inner tubular caisson B capable of being telescopically displaced in the caisson A, a mask or shield C, freezers 1 carried by the caisson A, further freezers 2 carried by the caisson B and further freezers 3 carried by the shield C. As will be clear from the drawings, particularly FIGS. 1 and 5, caissons A and B have dual lateral walls defining respective annular enclosures. The freezing devices 1 and 2 are disposed within the respective annular enclosures of caisson A and caisson B.

The apparatus comprises moreover hydraulic jacks 4 bearing on the caisson A and adapted to drive the freezers 1 into the ground in advance of the apparatus as well as jacks 5 bearing on the caisson B and adapted to drive the freezers 2 and 3 into the ground.

The freezers 1, 2, 3 are connected to supply pipes 7 to a source of refrigerating fluid and discharge pipes 8 to a recuperation vessel, not shown.

In each freezer the refrigerating fluid is admitted through the center and leaves through an annular chamber 9. In the freezers 1 carried by the caisson A, the annular chamber 9 extends right to the rear end of the freezer (FIGURE 3), while, in the freezers 2 and 3, this chamber 9 extends only over their front end part.

This apparatus can be used as follows:

As can be seen in FIGURE 1, the apparatus is introduced into the starting shaft 10 at the level of the horizontal gallery to be dug. Through the orifices provided in the wall of the shaft 10, the freezers 1 are driven into the ground, using the hydraulic jacks 4. Packings 11 are provided round the freezers 1 to ensure fluid-tightness at the level of the wall 10. The same is done to drive in the freezers 2 and 3. When all the freezers are in place, they are connected to the pipes 7 and 8 and refrigerating fluid is passed therethrough. Owing to the fact that the chamber 9 of the freezers 1 extends over their entire length, the ground is frozen over a greater extent than at the level of the freezers 2 and 3, the chamber 9 of which extends only over their end part. The frozen ground then forms a sort of basin D, as can be seen in FIGURE 5 (shaded part). The thickness of this basin D is determined as a function of the ground pressures and controlled by measuring devices 12.

When this frozen wall is ensured of having the desired fluid-tightness and resistance, the shield C is opened, the wall of the shaft 10 is cut away, the nonfrozen ground located inside the basin is extracted and evacuated so as to form a chamber E, FIG. 6, the diameter of which is greater than that of the caisson B. The latter is then advanced in the said chamber E by means of jacks 13 bearing on the caisson A, to the position shown in FIG. 7. The freezers 2, the jacks 5 of which are shown at rest in FIG. 6, and which are mounted in sliding fashion on the caisson B, do not move and hence are withdrawn at least partly into the caisson B, as can be seen in FIG. 7.

After re-closing the shield C, the basin D is thawed by circulating hot water in the freezers.

Once the ground is completely thawed, the outer caisson A is advanced by means of jacks 14 bearing on the opposite wall of the shaft 10. Under these circumstances the caisson A is brought flush with the caisson B and the freezers 1, 2, 3, which are still immobile, are partially retracted into the caisson A.

The apparatus is then in the position shown in FIGURE 8.

To continue the driving of the gallery, one proceeds again as indicated above.

In proportion as the gallery advances, one proceeds with its revetment 15 behind, as shown in FIG. 9. This revetment thus serves as a starting point for the caisson A. During this work, fluid-tight packing 16 may be provided between the caisson A and the revetment 15 of the gallery in order to avoid return of water into the gallery.

It should be pointed out that the apparatus described can be used for driving not only horizontal galleries but also inclined and even vertical ones (shafts).

It is obvious that the dimensions of the apparatus are determined as a function of the dimensions of the gallery or shaft to be driven and the stresses to be withstood.

It should be noted that this apparatus can likewise be used for treating the ground by injections (cement, bitumen, for example). In such cases the freezers are replaced by injection needles.

If the ground offers too great a resistance to the introduction of the freezers or needles, the ground may be drilled by suitable tools.

The present invention is not limited to the apparatus described. Thus, for example, in certain cases it would be advantageous to provide three or even more telescopic caissons.

I claim:

1. Apparatus for driving a gallery into unstable soil by stabilizing a substantially tubular shell of the soil laterally embracing the gallery or shaft to be excavated and having a closed forward end, said apparatus comprising, in combination, at least two tubular caissons, the inner one slidably telescoped within the outer one, the caissons having dual lateral walls defining respective annular enclosures; a removable shield at the forward end of said apparatus; first relatively elongated soil piercing devices disposed within the annular enclosure of the outer caisson and projecting forwardly of the latter; second relatively elongated soil piercing devices disposed within the annular enclosure of the inner casing and projecting forwardly of the latter, and disposed within the inner casing and projecting forwardly through said shield; said piercing devices being longitudinally displaceable relative to the associated caissons and said shield; first jack means engaged between the rear end of said outer casing and said first piercing devices; second jack means disposed between the rear end of said inner casing and said second piercing devices; said jack means being operable initially to project said piercing devices for substantially their full lengths forwardly of said casing and said shield; means, including said piercing devices, operable to solidify the soil along the full projected lengths of said first piercing devices and around only a shorter forward projected length of said second piercing devices, to stabilize said shell; whereby said shield may be removed and the soil within the solidified shell and along the rearward projected lengths of said second piercing devices may be extracted and evacuated; third jack means engaged between the rear ends of said inner and outer caissons and operable to advance said inner caisson, relative to said outer caisson, into the evacuated portion of the solidified shell, with said piercing devices remaining anchored within the solidified shell; and fourth jack means operable to advance said outer caisson into flush relation with said inner caisson with said piercing devices remaining so anchored, for repetition of the cycle.

2. Apparatus for driving a gallery or shaft, as claimed in claim 1, in which said shell is stabilized by freezing; said piercing devices comprising relatively elongated freezers; said first freezers being formed with an annular refrigerant circulating chamber extending throughout the entire length thereof, and said second freezers being formed with an annular refrigerant circulating chamber extending only throughout such shorter projected forward lengths thereof.

References Cited by the Examiner

UNITED STATES PATENTS

| 340,162 | 4/1886 | Sooysmith | 61—36.1 |
| 755,956 | 3/1904 | Sooysmith | 61—36.1 |
| 3,089,310 | 5/1963 | Torti | 61—41 |

FOREIGN PATENTS

| 199,657 | 1908 | Germany. |

CHARLES E. O'CONNELL, *Primary Examiner.*

JACOB SHAPIRO, *Examiner.*